(12) United States Patent
Waters et al.

(10) Patent No.: US 8,006,055 B2
(45) Date of Patent: Aug. 23, 2011

(54) FINE GRANULARITY HIERARCHIACAL MEMORY PROTECTION

(75) Inventors: Bradley M Waters, Woodinville, WA (US); Niklas Gustafsson, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 803 days.

(21) Appl. No.: 12/042,261

(22) Filed: Mar. 4, 2008

(65) Prior Publication Data

US 2009/0228673 A1     Sep. 10, 2009

(51) Int. Cl.
*G06F 12/00* (2006.01)
(52) U.S. Cl. ........................ 711/163; 711/156
(58) Field of Classification Search .................. 711/103, 711/170, 163, 156; 365/185.03, 185.18
See application file for complete search history.

(56) References Cited

U.S. PATENT DOCUMENTS

| | | | |
|---|---|---|---|
| 6,212,610 | B1 | 4/2001 | Weber et al. |
| 6,363,336 | B1 | 3/2002 | Banning et al. |
| 6,591,355 | B2 | 7/2003 | Schuster et al. |
| 6,775,750 | B2 | 8/2004 | Krueger |
| 7,266,658 | B2 * | 9/2007 | Harrington et al. ........... 711/163 |
| 7,277,999 | B1 | 10/2007 | Agesen et al. |
| 7,287,140 | B1 | 10/2007 | Asanovic et al. |
| 7,631,160 | B2 * | 12/2009 | Strongin et al. .............. 711/163 |
| 7,673,345 | B2 * | 3/2010 | Cheng et al. ................... 726/26 |
| 7,761,676 | B2 * | 7/2010 | Doshi et al. ................... 711/163 |
| 2003/0101322 | A1 * | 5/2003 | Gardner ......................... 711/163 |
| 2006/0036823 | A1 | 2/2006 | Mathews et al. |
| 2007/0156951 | A1 | 7/2007 | Sultan et al. |
| 2008/0140968 | A1 * | 6/2008 | Doshi et al. ................... 711/163 |
| 2008/0140971 | A1 * | 6/2008 | Dankel et al. ................. 711/163 |

FOREIGN PATENT DOCUMENTS

EP     0425771 A2     5/1991

OTHER PUBLICATIONS

Bryce, et al., "Matching Micro-Kernels to Modern Applications using Fine-Grained Memory Protection", at <<ftp://ftp.inria.fr/INRIA/publication/publi-pdf/RR/RR-2647.pdf>>, INRIA, 1995, pp. 19.
Miller, "Simple Memory Protection for Embedded Operating System Kernels", retrieved on Oct. 31, 2007, at <<http://www.cornfed.com/prot/prot.html>>, pp. 13.
Sheffield, et al., "Implementing Legba: Fine-Grained Memory Protection", at <<http://cse.seas.wustl.edu/Research/FileDownload.asp?765>>, Department of Computer Science & Engineering—Washington University in St. Louis, Jul. 23, 2007, pp. 11.
Shen, et al., "Tradeoffs in Fine Grained Heap Memory Protection", at <<http://www-static.cc.gatech.edu/grads/g/guru/acid06.pdf>>, ACM, 2006, pp. 6.
Witchel, et al., "Mondrian Memory Protection", at <<http://www.cag.csail.mit.edu/scale/papers/mmp-asplos2002.pdf>>, ACM, 2002, pp. 13.

* cited by examiner

*Primary Examiner* — Stephen C Elmore
(74) *Attorney, Agent, or Firm* — Lee & Hayes, PLLC

(57) ABSTRACT

Protection entries and techniques for providing fine granularity computer memory protection are described herein. A method of protecting a computer memory may include separating or parsing the computer memory, containing data or code, into blocks and creating protection entries for each block. The protection entries optionally include a reference field for identifying a block of memory, and a protection field for specifying one or more levels of access to the identified block of memory. The protection entries may then be used to pass messages between various system entities, the messages specifying one or more levels of access to the one or more blocks of memory or code.

19 Claims, 10 Drawing Sheets

Application 1 Protection Entry ← 902

| Reference Field | Protection ID | Memory Domain | Type | Grouping | R W E P I D EI Sh |
|---|---|---|---|---|---|
| 128...74 73 72 71 ... 67 66 65 64 ... | 38 37 36 35 34 33 | 32...25 | 24...19 | 18 17 16 15 14 13 12 11 10 9 | 8 7 6 5 4 3 2 1 |
| 0 ... 0 0 1 0 ... 0 0 0 0 ... | 0 0 1 0 0 0 | M...M | 0...0 | 0 1 0 0 0 0 0 0 0 0 | 1 1 0 0 1 0 0 0 |

Run Time Protection Entry ← 904

| Reference Field | Protection ID | Memory Domain | Type | Grouping | R W E P I D EI Sh |
|---|---|---|---|---|---|
| 128...74 73 72 71 ... 67 66 65 64 ... | 38 37 36 35 34 33 | 32...25 | 24...19 | 18 17 16 15 14 13 12 11 10 9 | 8 7 6 5 4 3 2 1 |
| 0 ... 0 0 1 0 ... 0 0 0 0 ... | 0 1 1 0 0 0 | M...M | 0...0 | 0 1 0 0 0 0 0 0 0 0 | 1 1 0 0 1 0 0 0 |

Task 1 in Application 1 ← 906

| Reference Field | Protection ID | Memory Domain | Type | Grouping | R W E P I D EI Sh |
|---|---|---|---|---|---|
| 128...74 73 72 71 ... 67 66 65 64 ... | 38 37 36 35 34 33 | 32...25 | 24...19 | 18 17 16 15 14 13 12 11 10 9 | 8 7 6 5 4 3 2 1 |
| 0 ... 0 0 1 0 ... 0 0 0 0 ... | 0 0 1 0 0 1 | M...M | 0...0 | 0 1 0 0 0 0 0 0 0 0 | 1 0 0 0 0 0 0 0 |

Application 2 Protection Entry ← 908

| Reference Field | Protection ID | Memory Domain | Type | Grouping | R W E P I D EI Sh |
|---|---|---|---|---|---|
| 128...74 73 72 71 ... 67 66 65 64 ... | 38 37 36 35 34 33 | 32...25 | 24...19 | 18 17 16 15 14 13 12 11 10 9 | 8 7 6 5 4 3 2 1 |
| 0 ... 0 0 1 0 ... 0 0 0 0 ... | 0 1 0 0 0 0 | M...M | 0...0 | 0 1 0 0 0 0 0 0 0 0 | 1 0 0 0 0 0 0 0 |

Task 2 in Application 2 ← 910

| Reference Field | Protection ID | Memory Domain | Type | Grouping | R W E P I D EI Sh |
|---|---|---|---|---|---|
| 128...74 73 72 71 ... 67 66 65 64 ... | 38 37 36 35 34 33 | 32...25 | 24...19 | 18 17 16 15 14 13 12 11 10 9 | 8 7 6 5 4 3 2 1 |
| 0 ... 0 0 1 0 ... 0 0 0 0 ... | 0 1 0 0 0 1 | M...M | 0...0 | 0 1 0 0 0 0 0 0 0 0 | 1 1 1 0 0 1 1 0 |

Fig. 9

| | LOWER LEVEL ENTITY | HIGHER LEVEL ENTITY | HIGHER LEVEL ENTITY COMPLETES TASK |
|---|---|---|---|
| PASS THROUGH ACCESS | Acquires pass-through access, limited by protection bits | Acquires access, limited by protection bits | Lower level entity may lose pass through access, Lower and higher level entity access determined by protection bits |
| INHERITED ACCESS | Retains access, limited by protection bits | Acquires inherited access, limited by protection bits | Lower and higher level entity access determined by protection bits |
| DELEGATED ACCESS | Replaces delegate with pass through access, limited by protection bits | Acquires delegated access, limited by protection bits | Lower level entity replaces pass through with delegate access, higher level entity loses delegate access, lower and higher level access limited by protection bits |
| EXCLUSIVE ACCESS | Loses exclusive access or may retain read-only access, limited by protection bits | Acquires exclusive access, limited by protection bits | Lower level entity reacquires exclusive access, higher level entity loses exclusive access, access limited by protection bits |
| SHARED ACCESS | Retains shared access, limited by protection bits | Acquires shared access, limited by protection bits | Lower and higher level entity access determined by protection bits |

Fig. 11

FINE GRANULARITY HIERARCHIACAL MEMORY PROTECTION

BACKGROUND

Computers malfunction or crash when a program corrupts the random access memory (RAM) that is being used by another program. Memory corruption may be caused, for example, by one computer program overwriting a memory segment being used by another computer program. Memory may also be corrupted by computer viruses. To reduce the risk of memory corruption and computer viruses, computer operating systems typically employ "system pages" and "protection rings" to protect the memory being used by different computer programs. Operating systems also protect process memory through the use of "process private pages" which reduce the risk of one process corrupting memory in another process.

System pages and process private pages prevent processes from interfering with the memory spaces that belong to the system and other processes by employing a separate address for each memory space. However, each process sees the entire address space as being uniquely assigned to it. To ensure that processes do not interfere with one another, operating systems typically maintain page tables that map the memory spaces virtual address to its corresponding physical address.

A protection ring represents a layer of privilege within the computers architecture. The protection rings are arranged in a hierarchy from the most privileged and trusted ring (i.e., operating system kernel ring, hypervisor ring) to the least privileged and trusted ring (i.e., process or application ring). The inner ring "Ring 0" for the kernel or "Ring −1" for a hypervisor has the most privileges and interacts most directly with the physical hardware (i.e., CPU and memory). Special gates between the rings allow the outer rings (e.g., Rings 1, 2, and 3) to access an inner ring's resources (e.g., Rings −1, 0, and 1) in a defined manner. Controlling or gating access between the rings improves security by preventing programs from one ring or privilege level from misusing the memory intended for another program.

Modern computer operating systems have linear addressing schemes in which each process has a virtual address space, typically referred to as "process private pages." A page of computer memory is typically 4K bytes or larger in size. In comparison, most data structures range in size from a few bytes to a few hundred bytes. Accordingly, the memory protection techniques employed by current operating systems have relatively coarse granularity.

Although system pages and protection rings are routinely used to provide memory protection, they have significant disadvantages when concurrent or simultaneous processing is performed. For example, programs are typically allowed to share memory only if the memory region resides at a virtual address that is mapped to each processes' address space. Moreover, coarse granularity protection which operates at the page level (e.g., typically 4K bytes) is inefficient given that the most data structures only are a few bytes in size. Lastly, transferring control between software modules is burdensome since accesses to entire pages of memory are typically involved and the page may contain data in which protection should not be changed.

Accordingly, there is a need for an improved method for providing fine granularity memory protection without the burden of additional inter-process communication, the inefficiency of coarse granularity memory protection, and the burden of transferring control to entire pages of memory.

SUMMARY

Protection entries and techniques for providing fine granularity computer memory protection are described herein.

In one implementation, a method for protecting computer memory may include separating or parsing computer memory or code into blocks and creating protection entries for each block. The protection entries may comprise a reference field for identifying the block of memory or code, and a protection field for specifying one or more levels of access to the block of memory or code. The protection entries may then be used to pass messages between various system entities. The protection entries or messages may specify one or more levels of access to one or more blocks of memory which may contain data or code.

In another implementation, a protection entry for implementing computer memory protection may include a reference field for identifying a portion of computer memory that is being protected and an access protection field for controlling access to that portion of computer memory.

Other message structures and methods according to other embodiments will become apparent to one with skill in the art upon review of the following drawings and detailed description. It is intended that all such additional message structures and methods be included within this description, be within the scope of the present disclosure, and be encompassed by the accompanying claims.

This summary is not intended to identify the essential features of the claimed subject matter, nor is it intended to determine the scope of the claimed subject matter.

BRIEF DESCRIPTIONS OF THE DRAWINGS

The disclosure is made with reference to the accompanying figures. In the figures, the left most reference number identifies the figure in which the reference number first appears. The use of the same reference numbers in different figures indicates similar or identical terms.

FIG. 9 illustrates message passing between two applications within a single memory space.

FIG. 11 illustrates the access rights that lower and higher level processes may grant and acquire.

DETAILED DESCRIPTION

The present disclosure generally relates to computer memory protection, and more specifically to protection entries and methods for providing fine granularity memory protection.

Computer operating systems typically execute several processes simultaneously by switching between processes. However, as more processes are executed by a computer operating system the individual processing period becomes shorter or the delay between executing processes becomes longer. To overcome these issues, current computers may employ multiple computer processors. Multi-core processors combine two or more computer processors into a single socket, thus providing faster processor speeds, enhanced thermal management, and more efficient packaging. However, as the number of processor cores increase, much more concurrent processing occurs as additional requests are processed simultaneously. Specifically, software entities such as application programs, run-time layers, operating systems, and hypervisors are executed concurrently as processes are executed concurrently.

Current computer programs could greatly benefit from fine granularity data protection since data structures could be passed between various system entities such as processes, applications, runtime layers, operating systems and hypervisors. Moreover, fine granularity data protection also ensures that various data requests are synchronized between the system entities.

The protection entries and the methods of implementing them, provide the capability to move data within and between various processes (e.g., applications, run-time layers, operating systems, hypervisors, to name a few), provide increased security for the multiple applications running in a single address space, allows data to pass through an entity without the entity accessing the data, and allows data to be shared among various entities within a software system, yet only allow a single entity at a time access to the data. In summary, these protection entries enable concurrent computer processing with improved data integrity, software reliability and security.

Protection Entries for Enabling Fine Granularity Data Protection

In general, the fine granularity memory protection decouples memory protection from virtualization, allowing protection domains to vary in size, as well as allowing memory protection to be provided in both physical and virtual memory. Fine granularity protection also allows ownership or access rights to data or code to be associated with a system entity or address space. Finally, fine granularity protection allows access protection in terms of read access, write access, execute access, pass-through access, inherited access, delegated access, exclusive access, shared access, or a combination of these.

Figure 1:
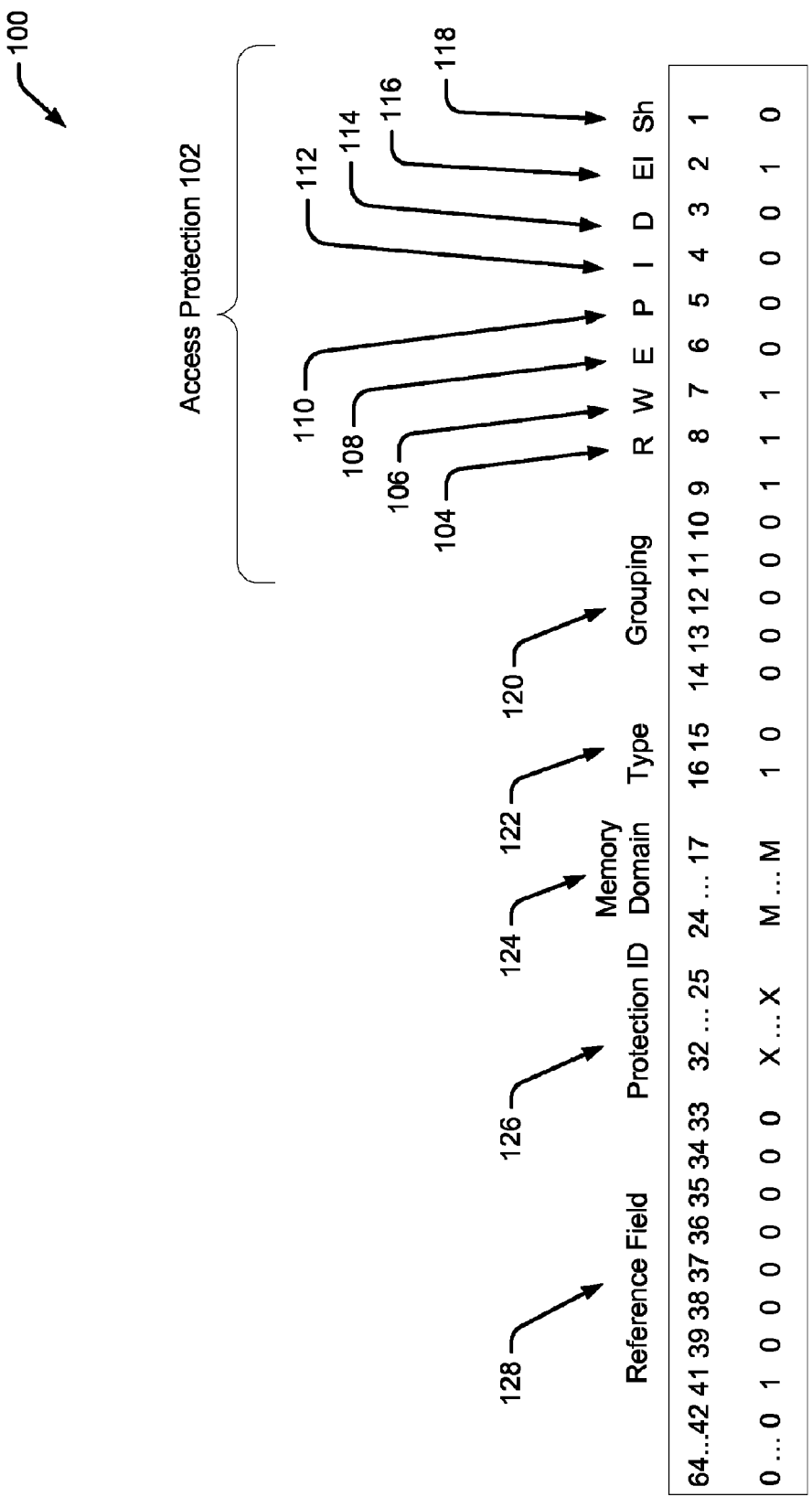
FIG. 1 depicts an illustrative protection entry for implementing fine granularity memory protection.

FIG. 1 illustrates an illustrative protection entry 100 for implementing fine granularity data protection. The last eight bits define the level of access protection 102 assigned or provided to a block of computer memory which could contain data or code. The first three bits define read access "R" 104, write access "W" 106, and execute access "E" 108. If the read bit 104 is set, the entity is allowed to read the data in the block of computer memory. If the write bit 106 is set, the entity is allowed to write to the block of computer memory. Finally, if the execute bit 108 is set, the entity is allowed to execute its process using the code in the memory block.

The next five protection bits denote whether access is allowed to "pass-through" "P" 110 to another process, whether access was inherited "I" 112 from another process, whether access can be delegated "D" 114 to another process, and whether a process has exclusive access "El" 116 or shared access "Sh" 118.

If a lower level process gives "pass-through" "P" 110 access to a higher level process, access to the block of memory is defined by the entities other protection bits (i.e., read, write, execute). For example, if the pass-through bit "P" 110 is set, and the read 104, write 106, and execute 108 bits are not set, then the lower level system entity (e.g., hypervisor, operating system, application, run-time, task) transfers access to another entity, but cannot access the data itself.

IF a higher level entity "inherits" "I" 112 access from a lower level entity, the lower level entity retains access to the block of memory, and the higher level entity gains access to the block of memory, again limited by its own protection bits.

If a lower level entity "delegates" "D" 114 its access to a higher level entity (e.g., another task), the lower level entity loses delegate access to the block of memory and the higher level entity gains or acquires delegate access based on its protection bits. It should be appreciated that inherited access 112 and delegated access 114 are mutually exclusive. To illustrate, an entity which delegates its access, transfers that delegate access to another entity with access to the block of memory determined by the protection bits. In contrast, an entity with pass-through access continues to have access to the block of memory, limited only by its own access limits.

An entity with "exclusive" "El" 116 access to a block of memory is the only entity with write access to that block of memory. For example, an entity with exclusive access is the only entity that has exclusive access to that block of memory and may modify it, and its access is limited by its own access provisions. It should be appreciated that exclusive access is provided without the requirement of locks or other methods of enforcing autonomy. Moreover, exclusive access eliminates the need for synchronization among entities or address spaces. In contrast, an entity with "shared" "Sh" 118 access to a block of memory shares its access to that block of memory with the other entities that also have shared access. The table of FIG. 11 illustrates the various access rights that lower and higher level system entities may grant and acquire from one another.

A protection entry 100 also makes it possible to protect multiple contiguous blocks of computer memory. For example, if the desired protection granularity is a cache line (i.e., 64 bytes), multiple cache lines can be grouped together to share the specified protection. The grouping field 120 defines the number of continuous memory blocks that are being protected. For example, if the grouping is "1", the protection entry applies to a single memory block. Similarly, if the grouping is "8", the protection applies to eight memory blocks. The size of the memory block is determined by multiplying the granularity of the memory block (e.g., 64 bits) by the number of memory blocks (e.g., 8) to determine that 512 bits of data are being protected.

The type field 122 defines the type of reference that is being associated with the protection entry 100 (i.e., address, handle, other object, etc.). Specifically, the type field 122 could designate an address (value=1), a handle (value=2), or other object (value=3). In this example, the type field 122 is a "2" and accordingly the reference field 128 corresponds to a handle.

The memory domain field 124 identifies a locality or coherency range of memory. For example, when system memory is fully cache coherent, such as cc-NUMA, the memory domain specified locality is the NUMA node that is referenced by the protection entity. Locality information allows the system to optimize its performance by using memory on the same node on which the process is running. In the case where system memory is not fully cache coherent, the memory domain may be used to identify which references maintain coherency. Coherency domains allow the use of memory that is restricted to a subset of processors with through physical accessibility or through hardware cache consistency restrictions.

The protection identification field (Protection ID) 126 identifies a particular protection domain associated with the reference field 128. A protection domain memory model allows code and data resources to be encapsulated in a protected environment. Such an environment is less rigid and allows for a system that can operate processes and tasks between how an operating system kernel ordinarily operates (without protection) and how applications traditionally operate (with full protection).

As noted previously, the reference field 128 specifies an address, a handle, or other object which the protection entity 100 corresponds. If the type field 122 specifies an "address" (i.e., value=1), the reference field 128 specifies the protection entries starting address. Alternatively, if the type field 122 specifies a "handle" (i.e., value=2), the handle is associated with one or more tasks, processes, threads, or other construction. Moreover, the handle could specify a protection ID 126 and be automatically transferred between handles as necessary. Finally, if the type field 122 specifies "other object" (i.e., value=3), the reference field 128 corresponds to an abstraction other than a handle. For example, in FIG. 1 the type field 122 is a "2" and accordingly the reference field 128 is associated with a handle.

Finally, it should be appreciated that the bit layout, as well as the number of bits, could vary based on the specific implementation, as well as the computers' hardware and software requirements. For example, the illustrative protection entry 100 is a single byte in size (i.e., 64 bits), however it could just as easily be 32 bits, 256 bits, or any other size based on the specific implementation.

Creation of Protection Entries

When a computer system is initialized, the protection entries associated with the one or more hypervisor(s), operating system(s), application(s), run time(s), and task(s) are not enabled. Accordingly, the lowest level entry (i.e., hypervisor, operating system, application, or other initialization entry) creates the initial protection entries and provides an interface to use the protection entry mechanism.

Figure 2:
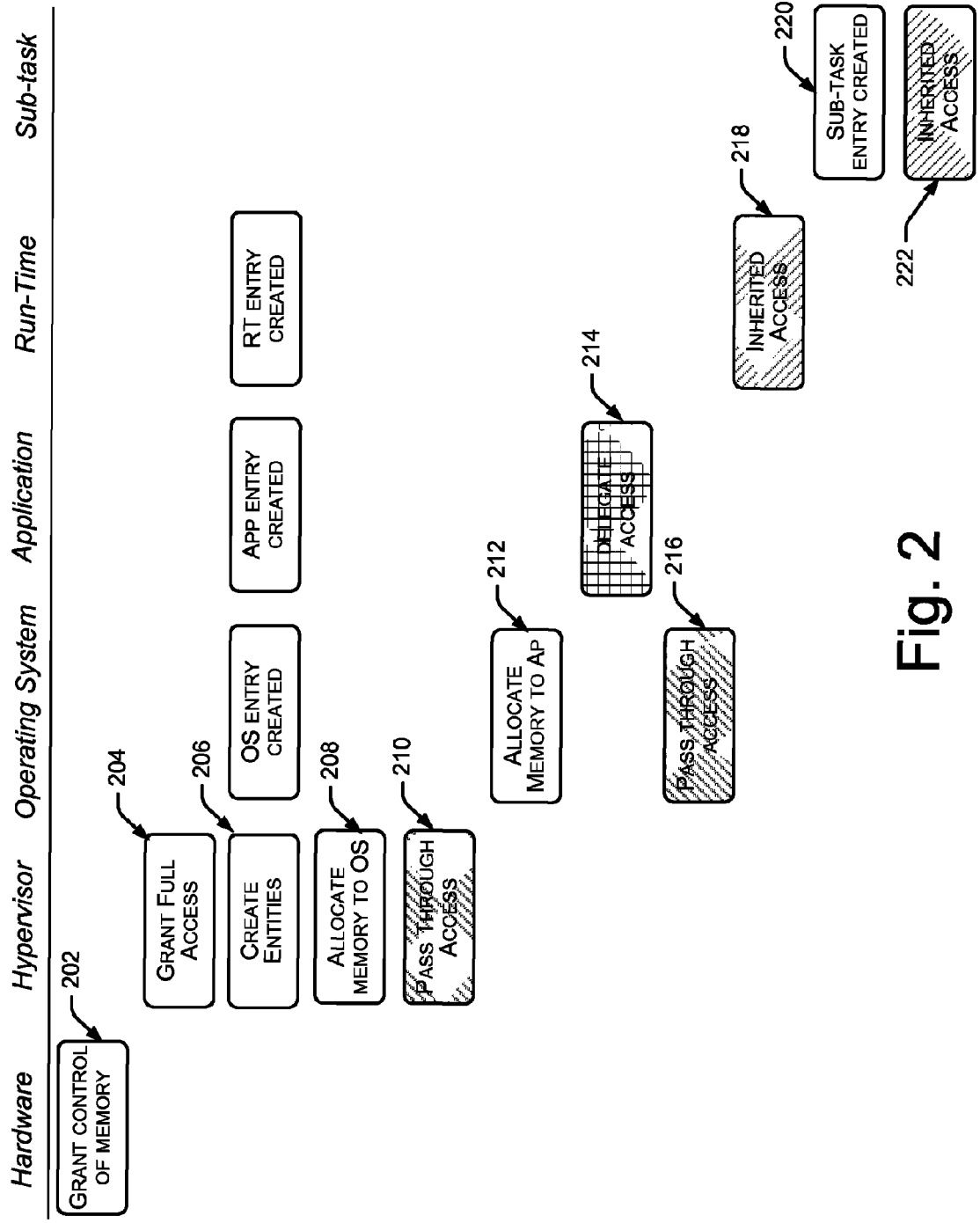
FIG. 2 illustrates how a computer system may create the protection entries.

FIG. 2 illustrates how protection entries may be created for a variety of processes. When the computer system is booted up (i.e., started), it gives the lowest level entry (i.e., hypervisor) overall control of the memory space, at block 202. The hypervisor, if present, then grants itself "full access" by setting its protection ID bit to "1", at block 204. Full access allows the hypervisor to set its own access protection bits and retain access to the entire block of memory. The hypervisor then creates one or more operating system entries, as well as other protection entries (e.g., application, run-time, and task) at block 206, and allocates its entire memory space to the operating system, at block 208.

Figure 3:
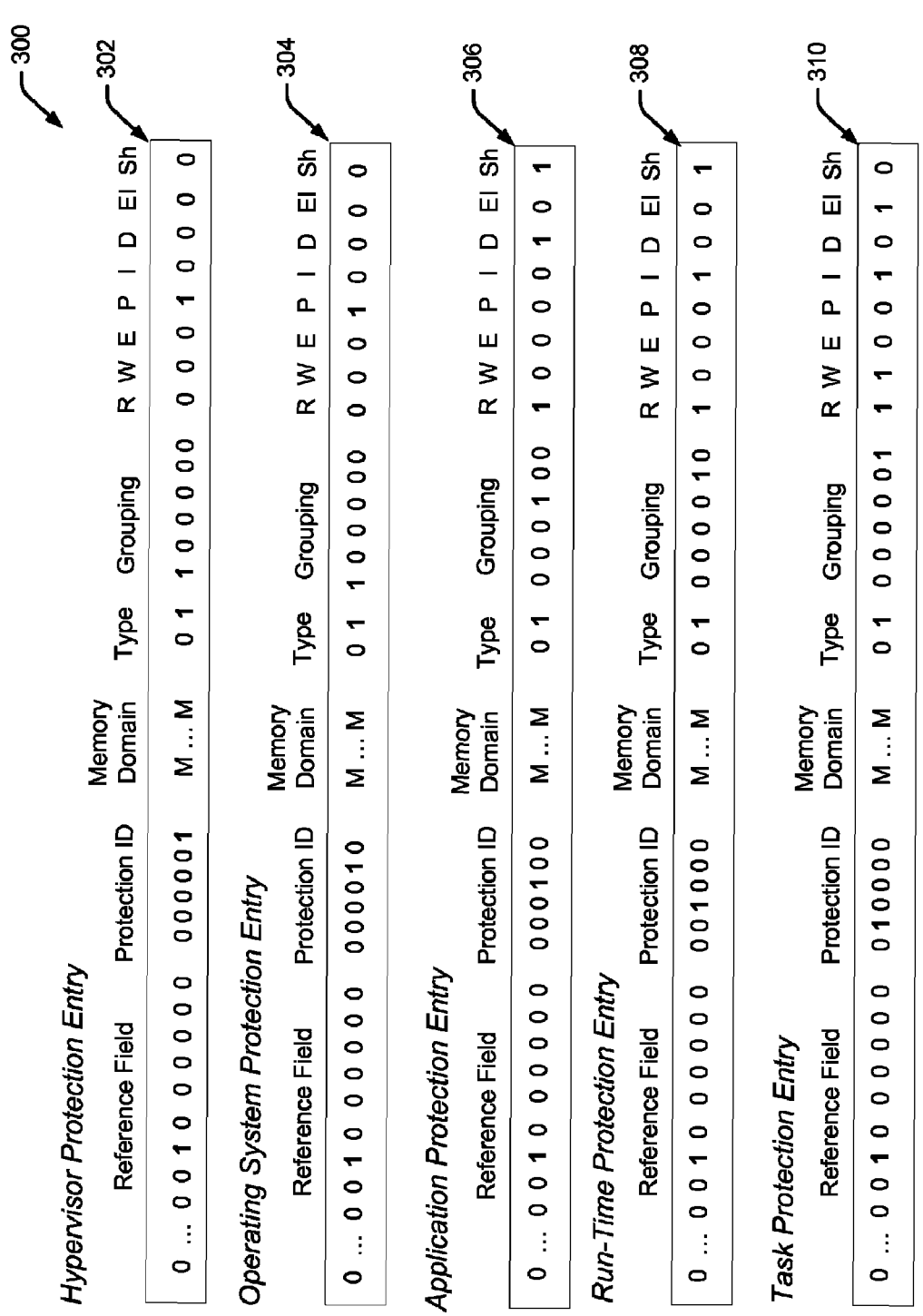
FIG. 3 depicts an illustrative hierarchal arrangement of protection entries.

FIG. 3 illustrates a hierarchal arrangement of protection entries 300. In FIG. 3, the operating system protection entry's (operating system) 304 protection ID bit of is set to "2", and the operating system 304 has access to the same block of memory as the hypervisor protection entry 302 (e.g., grouping=128).

Referring back to FIG. 2, the hypervisor then changes its access to pass through access (i.e., pass through "P"=1), at block 210. This allows the hypervisor to move data to or from various devices as requested by the operating system. However, based on the hypervisor's access protection bits it does not have access to the data (i.e., read, write, and execute bits are set to "0").

The operating system may then allocate a portion of its memory space to the application, at block 212. For example, in FIG. 3 the application protection entry (application) 306 has been assigned delegated access 214 (i.e., delegation bit "D"=1), and the operating system 304 retains pass through access 216 (i.e., pass through bit "P"=1). As previously noted, pass through access allows the operating system 304 to access the block of memory, however its access is restricted based on its access protection settings.

The application may then assign the run-time inherited access (i.e., inherited access bit=1) and other access rights as necessary, at block 218. For example, in FIG. 3, the application 306 has granted the run-time 308 shared, read access (i.e., read "R" and shared "Sh" bits).

The run-time may then create one or more sub-task entries with the access rights it has been granted, at block 220. Referring again to FIG. 3, the run-time 308 has granted task 310 inherited access 222 (i.e., inherited access bit=1), along with read, write, and exclusive access (i.e., read "R", write "W", and exclusive "El" bits=1). Note that protection entries with delegated access (i.e., application 306) can be determined by tracing the entries with inherited access up the hierarchy.

It should be appreciated that the protection entries and the method in which they were created are exemplary and that other protection entries and other methods of creating them may be employed.

Hierarchical Arrangement of Protection Entries

Once a protection entry has been created, it then may be arranged or organized in a hierarchical manner, thereby creating sub-protection domains within a single process or system entity (e.g., run-time layers, operating systems, hypervisor layers).

Figure 4:
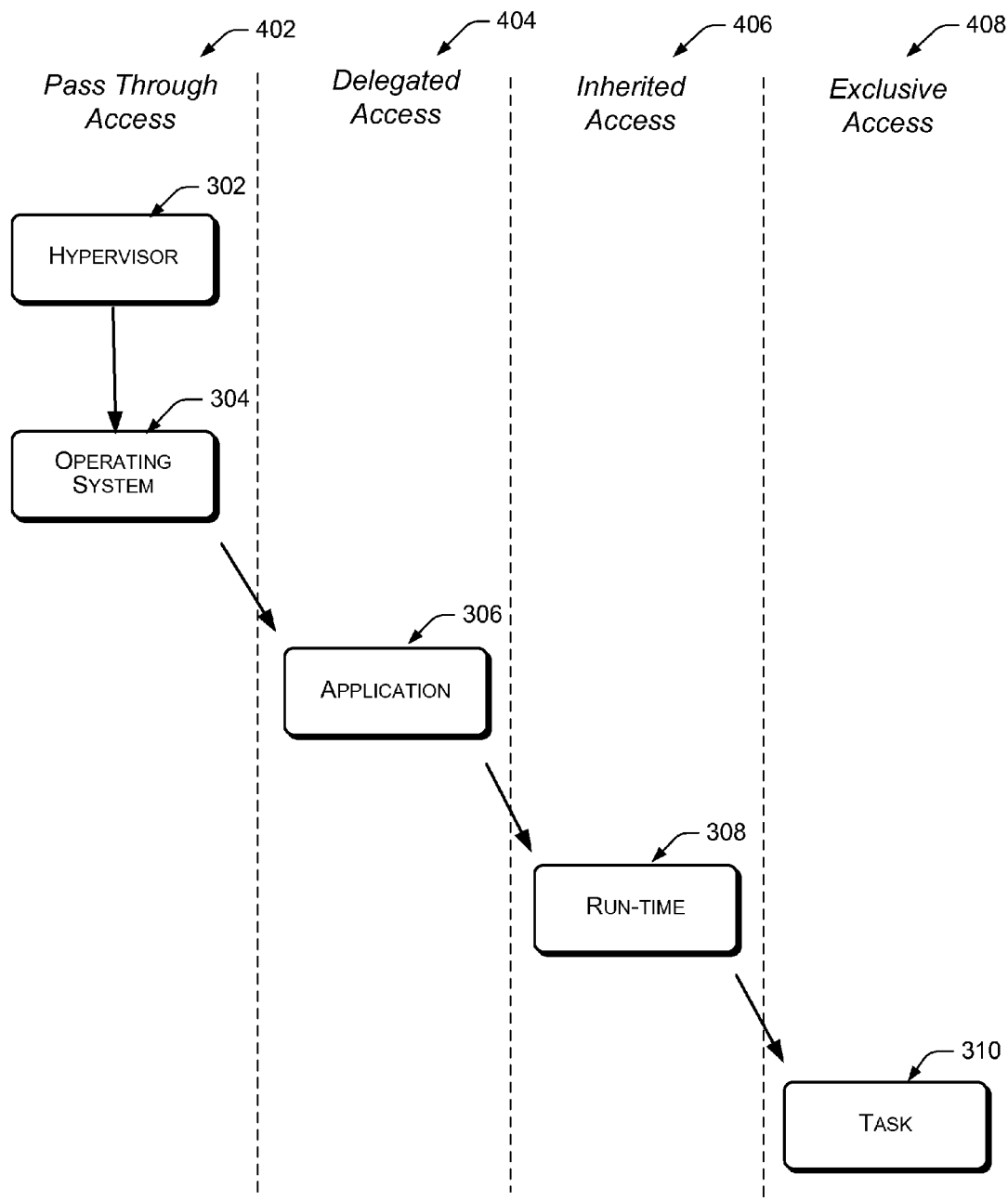
FIG. 4 illustrates how the protection entries may be arranged in a hierarchical manner.

FIG. 4 illustrates a group of protection entries that have been arranged in the aforementioned hierarchical manner. In this example, the hypervisor protection entry (hypervisor) 302 and operating system protection entry (operating system) 304 have been assigned pass through access 402 to a specific block of memory (i.e., pass through bit "P"=1). Specifically, the hypervisor 302 and operating system 304 have granted the application protection entry (application) 306, run-time protection entry (run-time) 308, and task protection entry (task) 310 access to at least a portion of the block of memory that they control. The application 306 has delegate access 404 to the block of memory (i.e., delegated bit "D"=1). Meanwhile, the run-time 308 has inherited access 406 (i.e., inherited bit "I"=1) from the application 306. Finally, task 310 has exclusive access 408 to the block of memory (i.e., exclusive "E"=1), which grants it exclusive access to the data found within the block of memory.

When a system entity completes its task(s) or no longer requires access to its assigned block of memory, the entity may give up its access. For example, when task 310 with exclusive access completes its task; the application 306, which previously delegated 404 access to the task 310 regains or reacquires access to the block of memory. Conversely, when application 306 with delegated access 404 completes its task; the run-time 308, which inherited access 406 from the application 306, can delegate access to a new task or application.

Figure 5:
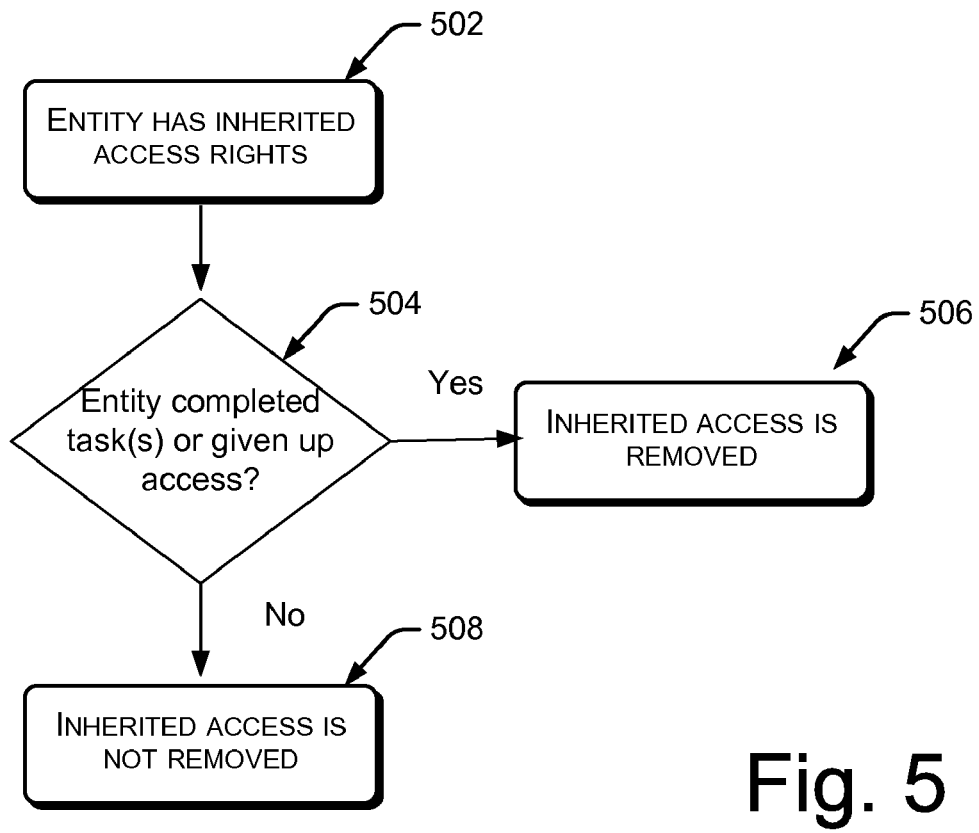
FIG. 5 illustrates a protection entry with inherited access rights loosing those rights when it completes its task.

FIG. 5 illustrates how an entity with inherited access rights "I" loses its rights when it completes its task(s). First, the entity must have inherited its access rights, at block 502. Specifically, the inherited access protection bit must be set to "1." Then, the entity must have completed all of its task(s) or otherwise given up access, at block 504. If the entity has completed its task(s) or otherwise given up access, the inherited access rights are lost and the entry no longer has access to the memory block, at block 506. Conversely, if the entry has not completed its tasks nor given up access, the entry maintains its inherited access rights, at block 508.

Figure 6:
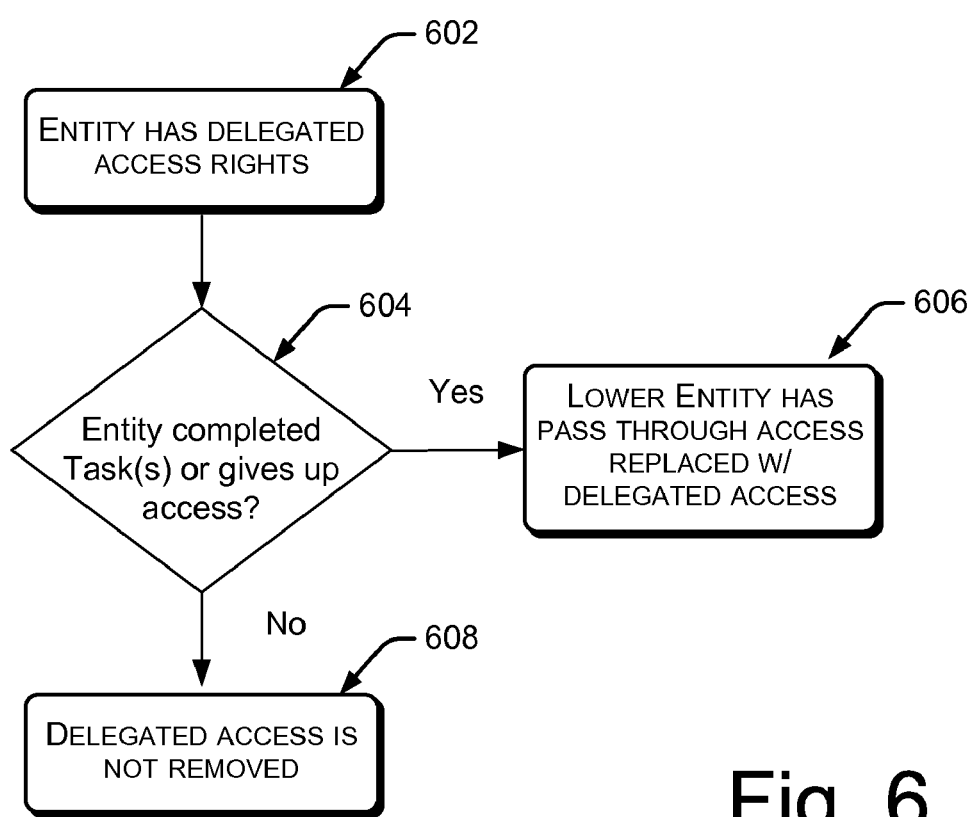
FIG. 6 illustrates a lower level entry updating its access rights from pass through to delegated access if a higher level entity completes or gives up access.

FIG. 6 illustrates how a lower level entity (e.g., operating system) updates its access rights from pass through access "P" to delegated access "D" if a higher level entity (e.g., application) with delegated access completes its task(s) or otherwise gives up access. First, the higher level entity must have delegated access, at block 602. Specifically, the delegated access protection bit must be set to "1." Then, the higher level entity must have completed its task(s) or otherwise given up access via a free or other return operation, at block 604. If the entry has completed its task(s) or given up access, the lower level entities pass through access rights are replaced with delegated access rights, at block 606. Alternatively, if the higher level entry has not completed its tasks nor given up access, the lower level entry maintains its pass through access, at block 608. Once the lower level entry has acquired delegated access, it regains access to the memory block and the ability to manage it.

Protection entries may also employ different memory groupings or be implemented in varying granularities. Protection entries can be implemented in systems where memory is organized in pages, and they can be implemented in systems without a page organization structure. Moreover, the memory blocks associated with a protection entry can be split or joined with other memory blocks, since fine granularity memory protection does not need to be associated with an entire block of memory.

Figure 7:
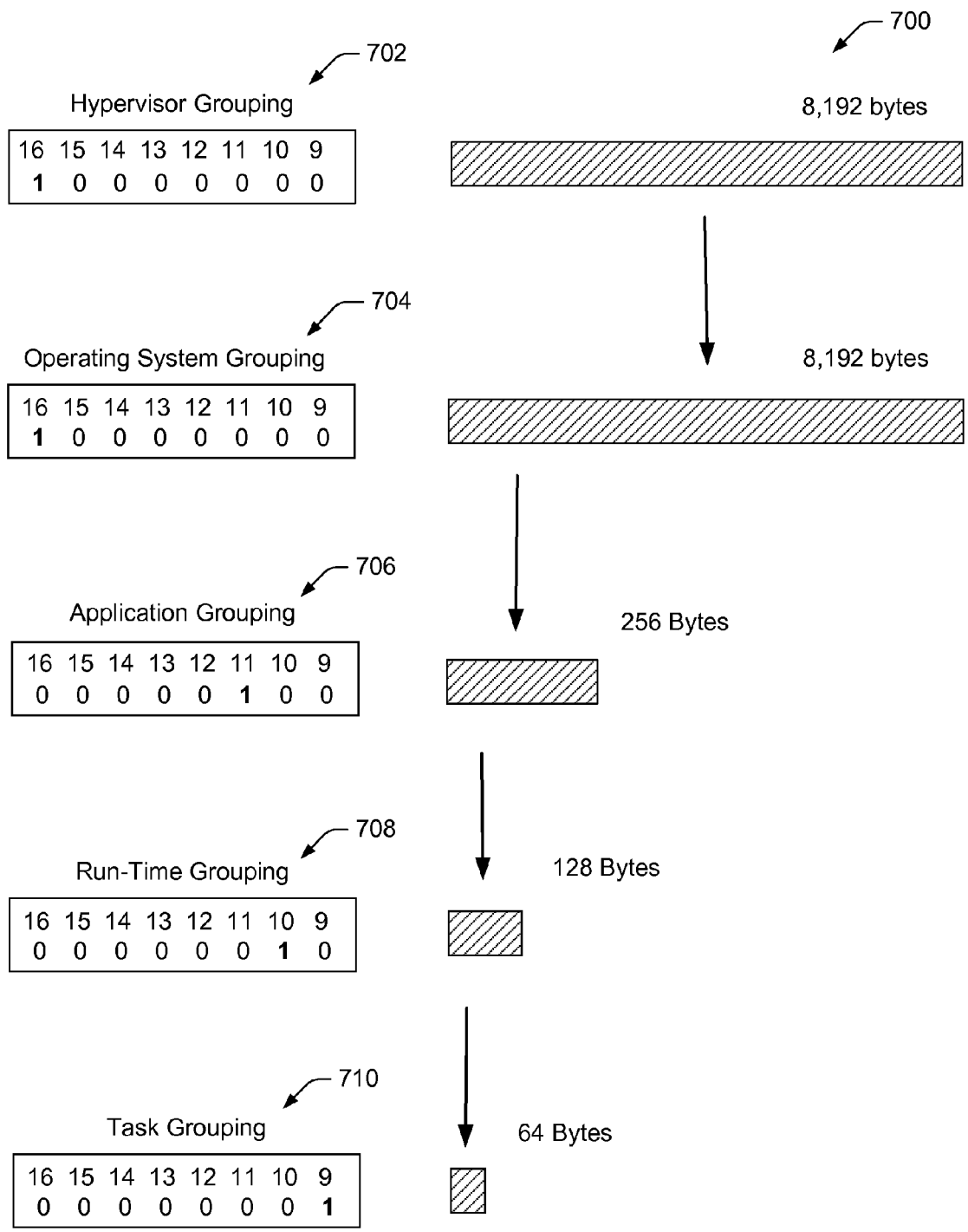
FIG. 7 illustrates how protection entries may protect blocks of computer memory with various sizes.

FIG. 7 illustrates a hierarchical arrangement of protection entries with various memory groupings 700. In this example, the hypervisor protection entry (hypervisor) 702 and operating system protection entry (operating system) 704 both have groupings of 128 continuous memory blocks, which corresponds to a block size of 8,192 bytes (i.e., 128 blocks×64 bytes per block). The application protection entry (application) 706 has been granted access to 4 memory blocks, which corresponds to a block size of 256 bytes. Meanwhile, the run-time protection entry (run-time) 708 has been granted access to 2 memory blocks, which corresponds to a block size of 128 bytes. Finally, the task protection entry (task) 710 has been granted access to 1 memory block, which corresponds to a block size of 64 bytes respectfully. However, the memory groupings for the various system entities may vary based on hardware and software requirements of the particular computer processor, computing system, computer network, or computing environment.

It should be appreciated that the protection entries and the memory groupings are exemplary and that other protection entries and memory groupings may be employed.

Message Passing

Fine granularity memory protection allows the ownership or access to blocks of memory containing data or code, to be transferred among system entities (i.e., applications, run-time layers, operating systems, hypervisors, to name a few). Moreover, fine granularity memory protection allows ownership or access rights to be exclusive or shared among entries or address spaces.

One area where fine granularity data protection provides a benefit is in the passing of messages between threads of execution, or simply "threads." For example, where several threads exist within a single process and two of those threads want to exchange data while ensuring that no other threads interfere. Current process-visible address space models cannot isolate the data. Instead, all the threads within the process can access all the data. However, by creating protection entries for both threads the data can be isolated.

Figure 8:
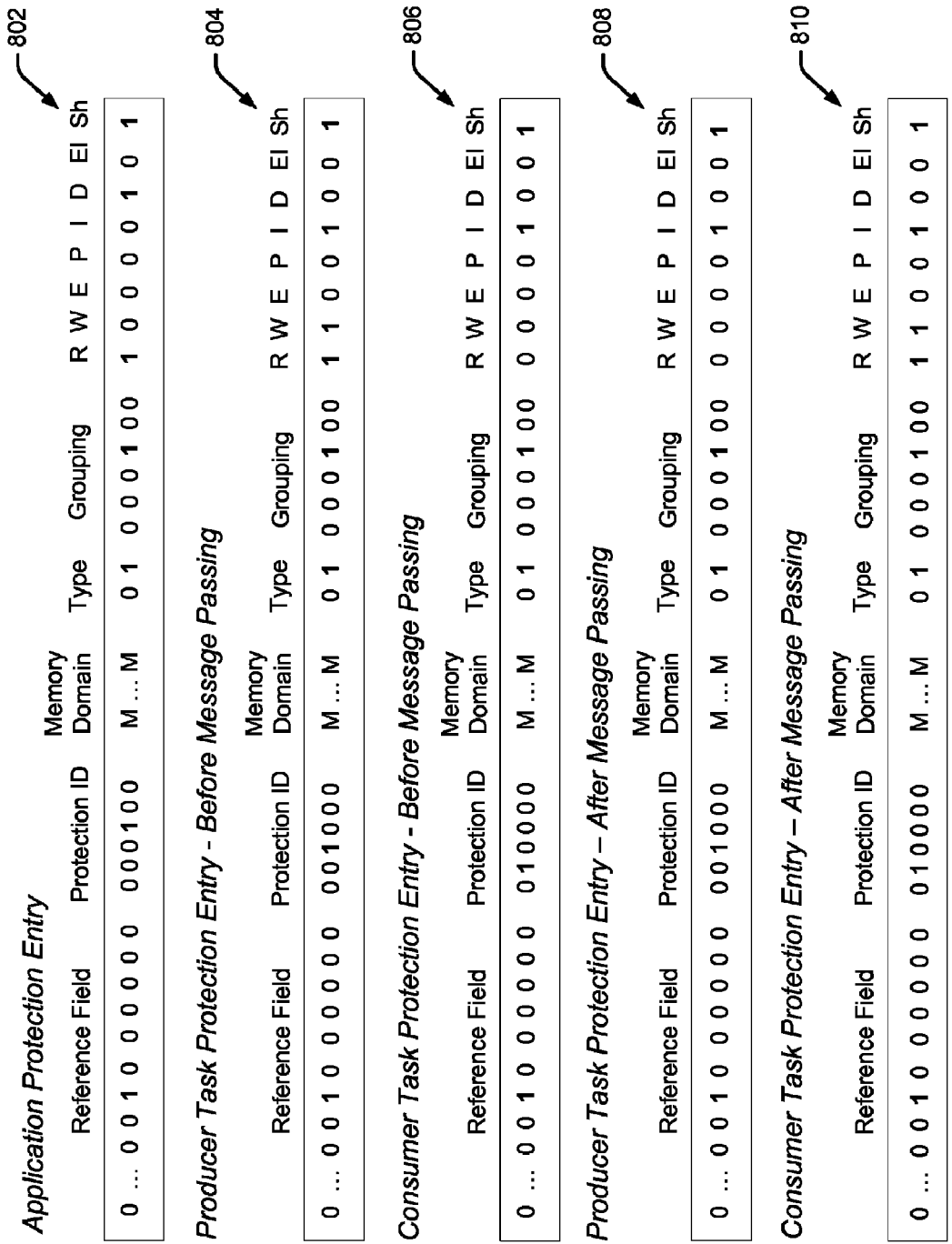
FIG. 8 illustrates message passing between two threads in a single application.

FIG. 8 illustrates message passing between two threads in a single process or application. In this example, two task protection entries 804, 806 share the same block of memory as the application protection entry (application) 802 (i.e., grouping=256 bytes). The application 802 has delegated, shared, read only access respectfully (i.e., read access "R", delegated access "D", and shared access "Sh"=1), while the producer task entry (producer task) 804 has inherited, shared, read, and write access (i.e., read access "R", write access "W", inherited access "I", and shared access "Sh"=1) and the consumer task entry (consumer task) 806 has inherited, shared, access but no read or write access (i.e., inherited access "I", and shared access "Sh"=1). Since the producer task 804 has shared, read and write access it is only allowed to read, modify, and write to the block of memory and the consumer task 806 has shared, but no read or write access to the block of memory, and therefore cannot read, modify or write to the block of memory until the memory block has been passed to it.

Once a message, contained in the memory block, is passed between the producer task protection entry (producer task) 808 and consumer task protection entry (consumer task) 810. The consumer task 810 acquires read and write access while the producer task 808 looses its read and write access to the memory. Accordingly, the producer task 808 has inherited, shared, access, but is not able to read, modify, or write to the block of memory (i.e., inherited access "I", and shared access "Sh"=1). While the consumer task 810 has inherited, shared, read, and write access, and is able to read, modify, and write to the block of memory (i.e., read access "R", write access "W", inherited access "I", and shared access "Sh"=1).

FIG. 9 illustrates a series of protection entries which are configured to perform message passing between two applications that reside in a single memory space. The first application protection entry 902 has a block size of 64 bytes (i.e., grouping of 1×64 bytes), an address of 16384 (i.e., 256×64 bytes), and a protection domain of 36 (i.e., protection ID bit=36). The second application protection entry 908 also has a block size of 64 bytes, and an address of 16384; however, its protection domain is 37. The run-time protection entry 904 runs on behalf of both applications 902, 908, therefore its protection bits are set at 36 and 37, respectfully.

Since tasks are generally part of an application, they typically share the same protection bits as the application. In this example, the first application protection entry 902 and first task protection entry 906 share protection bit 36, while the second application protection entry 908 and second task protection entry 910 share protection bit 37.

Figure 10:
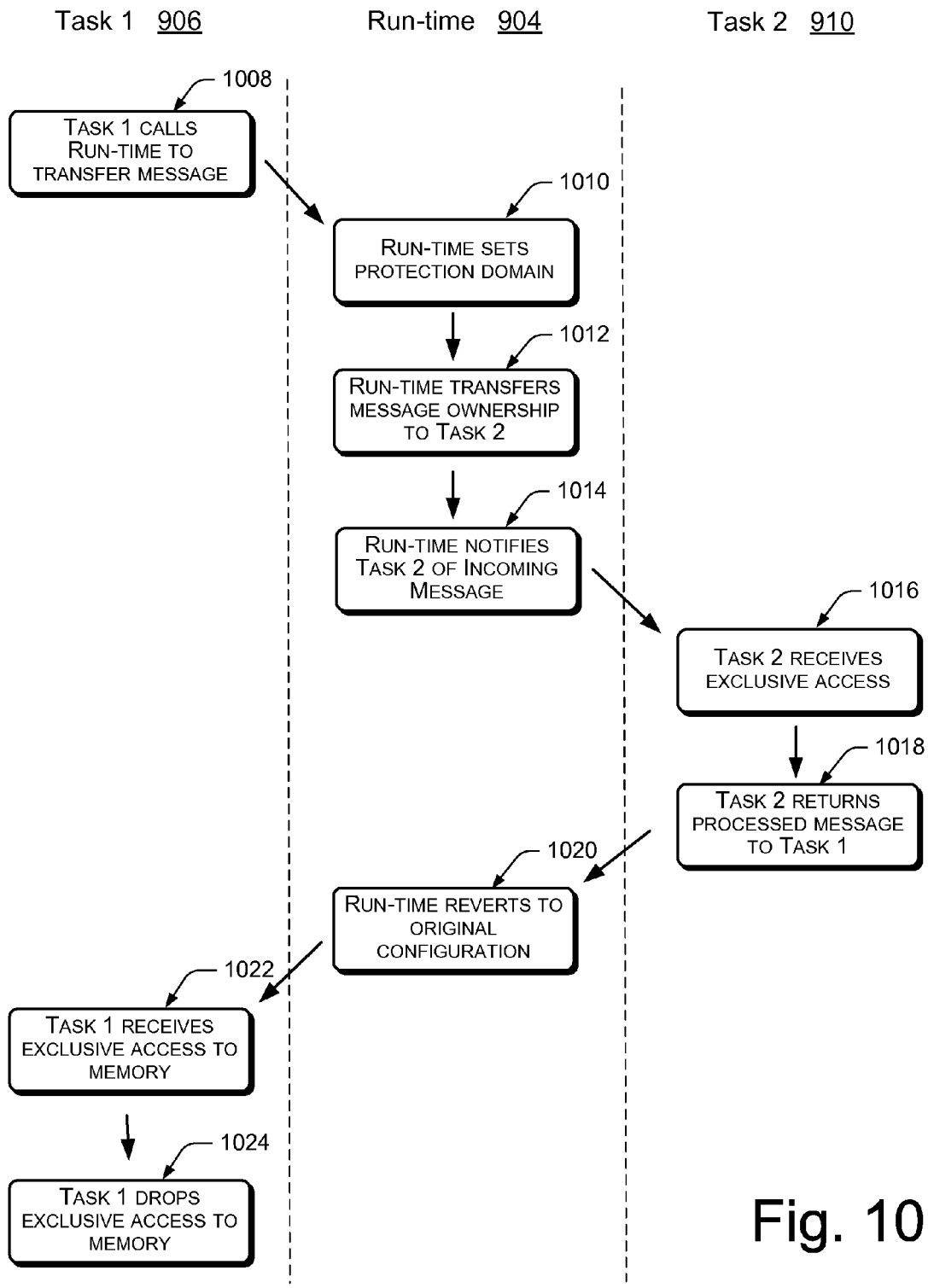
FIG. 10 illustrates message passing between two tasks by employing a run-time layer message.

FIG. 10 illustrates message passing between two tasks by employing a run-time message. The first task 906 makes a run-time call to transfer a message to the second task 910, at block 1008. The run-time layer 904 then makes an application program interface (API) call to set its protection domain, at block 1010. Since the run-time 904 is a superset of the first application 902 and the second application 908, its protection ID bits are 36 and 37, respectfully. The run-time 904 then makes an API call to transfer message ownership to the second task 910, at block 1012. In one embodiment, the access of the first task 906 is reduced to read only, pass through access, and the second task 910 is given delegated, exclusive read and write access (see FIG. 9). In an alternate embodiment the first task 906 relinquishes its access to the memory block. The run-time 904 then notifies the second task 910 of the message that needs to be processed, at block 1014. If the second task 910 is not already running, the message alerts it that a message is available for processing.

As part of the second tasks 910 activation process, the protection ID bits are set through task switching code or via an express command. The second task 910 then receives the message from the run-time layer 904 and receives exclusive access to the memory block, at block 1016. Then the second task 910 makes a run-time call to return the completed message to the first task 906, at 1018. The run-time layer 904 then makes an API call to return message ownership to the first task 906 and reverts back to its initial protection configuration (i.e., read only, pass through access) before returning to the first task 906, at block 1020. The first task 906 receives exclusive access to the block of memory block and the second task 910 relinquishes its access, at block 1022. Finally, the first task 906 makes a run-time call to drop its exclusive access to the message, at which point the run-time layer 904 makes an API call to drop exclusive access to the memory area, at block 1024.

It should be appreciated that the protection entries shown and described are exemplary and other means of message passing between protection entries may be used.

Although protection entries and methods for providing fine granularity memory protection have been described in language specific to certain features or methodological acts, it is to be understood that the disclosure is not limited to the specific features or acts described. Rather, the specific features and acts are disclosed as exemplary forms of implementing the disclosure.

We claim:

1. A method of protecting a computer memory comprising:
   creating, by a processor, one or more protection entries for multiple blocks of data or code stored in the computer memory; and
   passing the one or more protection entries between system entities, wherein the one or more protection entries specify one or more levels of access for the multiple blocks of data or code.

2. The method of claim 1, wherein the one or more levels of access comprise pass-through access, inherited access, delegated access, exclusive access, or shared access.

3. The method of claim 1, wherein the system entities comprises one or more of a process, an application, a run-time layer, an operating system, a task, a thread, or a hypervisor.

4. The method of claim 1, wherein the one or more protection entries transfer ownership of the multiple blocks of data or code to a receiving entity.

5. The method of claim 1, wherein the one or more protection entries pass through the system entities without providing the system entities access to the one or more protection entries.

6. The method of claim 1, wherein the one or more protection entries are accessible by a single system entity at a time.

7. The method of claim 1, wherein the one or more protection entries are passed between threads that exist within a single process.

8. The method of claim 1, wherein the multiple blocks of data or code are less than a page of computer memory in size.

9. The method of claim 1, wherein the one or more protection entries are approximately a size of a processor cache-line.

10. The method of claim 1, wherein the computer memory comprises one or more of a physical memory or a virtual memory.

11. A computer readable storage medium comprising computer executable instructions that when executed by a processor creates at least one protection entry for implementing memory protection, the at least one protection entry comprising:
    one or more reference bits for identifying a portion of computer memory being protected; and
    one or more access protection bits for specifying one or more levels of access to the portion of the computer memory being protected, the one or more levels of access including at least pass-through access between system entities.

12. The computer readable storage medium as recited in claim 11, the at least one protection entry further comprising one or more grouping bits for identifying a size of the portion of computer memory being protected.

13. The computer readable storage medium as recited in claim 11, wherein the one or more levels of access further comprises inherited access, delegated access, exclusive access, or shared access.

14. The computer readable storage medium as recited in claim 11, wherein the at least one protection entry is associated with one or more of a process, an application, a run-time layer, an operating system, a task, a thread, or a hypervisor.

15. A method for creating a protection entry comprising:
    assigning a first protection entry complete access to a block of computer memory;
    creating, by a processor, a second protection entry, the second protection entry being assigned less than complete access to the block of computer memory; and
    assigning the first protection entry less than complete access to the block of computer memory after the second protection entry is assigned less than complete access to the block of computer memory.

16. The method of claim 15, wherein assigning the first protection entry or the second protection entry less than complete access to the block of computer memory comprises one or more of assigning pass-through access, delegated access, inherited access, or shared access.

17. The method of claim 15, wherein assigning the first protection entry or the second protection entry less than complete access to the block of computer memory comprises assigning access to a portion of the block of computer memory.

18. The method of claim 15, wherein the second protection entry comprises one or more of an operating system entry, an application entry, a run-time entry, or a task entry.

19. The method of claim 15, wherein the first protection entry comprises a hypervisor entry.

* * * * *

UNITED STATES PATENT AND TRADEMARK OFFICE
CERTIFICATE OF CORRECTION

PATENT NO. : 8,006,055 B2  
APPLICATION NO. : 12/042261  
DATED : August 23, 2011  
INVENTOR(S) : Bradley M. Waters et al.

Page 1 of 1

It is certified that error appears in the above-identified patent and that said Letters Patent is hereby corrected as shown below:

In Title page, in field (54), under "Title" column 1, line 1, delete "HIERARCHIACAL" and insert -- HIERARCHICAL --, therefor.

In column 1, line 1, delete "HIERARCHIACAL" and insert -- HIERARCHICAL --, therefor.

Signed and Sealed this  
Fourth Day of October, 2011

David J. Kappos  
*Director of the United States Patent and Trademark Office*